US012005999B2

(12) United States Patent
Lee et al.

(10) Patent No.: US 12,005,999 B2
(45) Date of Patent: Jun. 11, 2024

(54) SHIP

(71) Applicant: DAEWOO SHIPBUILDING & MARINE ENGINEERING CO., LTD., Geoje-si (KR)

(72) Inventors: Seung Chul Lee, Seoul (KR); Seon Jin Kim, Seoul (KR)

(73) Assignee: HANWHA OCEAN CO., LTD., Geoje-si (KR)

(*) Notice: Subject to any disclaimer, the term of this patent is extended or adjusted under 35 U.S.C. 154(b) by 0 days.

(21) Appl. No.: 16/090,120

(22) PCT Filed: Oct. 21, 2016

(86) PCT No.: PCT/KR2016/011886
§ 371 (c)(1),
(2) Date: Sep. 28, 2018

(87) PCT Pub. No.: WO2017/171171
PCT Pub. Date: Oct. 5, 2017

(65) Prior Publication Data

US 2019/0112009 A1 Apr. 18, 2019

(30) Foreign Application Priority Data

Mar. 31, 2016 (KR) ........................ 10-2016-0039507

(51) Int. Cl.
*F17C 6/00* (2006.01)
*B63B 25/16* (2006.01)
(Continued)

(52) U.S. Cl.
CPC ................ *B63B 25/16* (2013.01); *F17C 6/00* (2013.01); *F17C 9/02* (2013.01); *F25J 1/0025* (2013.01);
(Continued)

(58) Field of Classification Search
CPC ......... F25J 1/0025; F25J 1/004; F25J 1/0202; F25J 1/0296; F25J 1/023; F25J 1/0277;
(Continued)

(56) References Cited

U.S. PATENT DOCUMENTS 3,919,852 A * 11/1975 Jones ..................... F25J 1/0037 62/7
4,727,723 A * 3/1988 Durr ...................... F25J 1/0045 62/48.2
(Continued)

FOREIGN PATENT DOCUMENTS

CN 103703299 A 4/2014
JP 2014-514513 A 1/1900
(Continued)

OTHER PUBLICATIONS

Min Chen, A new recovery process of BOG (boil-off-gas) using low temperature nitrogen (Year: 2013).*
(Continued)

*Primary Examiner* — John F Pettitt, III
*Assistant Examiner* — Webeshet Mengesha
(74) *Attorney, Agent, or Firm* — K&L Gates LLP

(57) ABSTRACT

A ship comprises: a liquefied gas storage tank; a multi-stage compressor for compressing a boil-off gas discharged from a storage tank and comprising a plurality of compression cylinders; a second heat exchanger for heat exchanging a fluid, which has been compressed by the multi-stage compressor, and thus cooling same; a first decompressing device for expanding a flow (“flow a1”) partially branched from the flow (“flow a”) that has been cooled by the second heat exchanger; a third heat exchanger for heat exchanging, by “flow a1” which has been expanded by the first decompressing device as a refrigerant, the remaining flow (“flow a2”) of “flow a” after excluding “flow a1” that has been branched
(Continued)

and thus cooling same; and a second decompressing device for expanding "flow a2" which has been cooled by the third heat exchanger.

4 Claims, 1 Drawing Sheet

(51) Int. Cl.
*F17C 9/02* (2006.01)
*F25J 1/00* (2006.01)
*F25J 1/02* (2006.01)

(52) U.S. Cl.
CPC ............. *F25J 1/004* (2013.01); *F25J 1/0277* (2013.01); *F17C 2227/0185* (2013.01); *F17C 2227/0351* (2013.01); *F17C 2227/0358* (2013.01); *F17C 2265/033* (2013.01); *F17C 2270/0105* (2013.01)

(58) Field of Classification Search
CPC ... F25J 1/0042; F17C 6/00; F17C 9/02; F17C 7/00; F17C 2227/036; F17C 2227/0157; F17C 2227/0339; F17C 2227/0358; F17C 2227/0351; F17C 2227/0185; B63B 25/16
See application file for complete search history.

(56) References Cited

U.S. PATENT DOCUMENTS

| | | | | | |
|---|---|---|---|---|---|
| 2009/0282862 | A1* | 11/2009 | Chantant | F25J 1/0055 | 62/614 |
| 2014/0102133 | A1* | 4/2014 | Duckett | F17C 13/004 | 62/613 |
| 2014/0123699 | A1* | 5/2014 | Duckett | F25J 1/0025 | 62/611 |

FOREIGN PATENT DOCUMENTS

| | | | | |
|---|---|---|---|---|
| JP | 2009-204026 | A | | 9/2009 |
| JP | 2014-511985 | A | | 6/2014 |
| KR | 10-2002-0066331 | A | | 8/2002 |
| KR | 20120045802 | | * | 5/2012 |
| KR | 101496577 | B1 | | 5/2014 |
| KR | 10-2014-0075582 | A | | 6/2014 |
| KR | 10-2015-0001597 | A | | 1/2015 |
| KR | 10-2015-0033279 | A | | 4/2015 |
| KR | 10-2015-0039427 | A | | 4/2015 |
| WO | 2015/130122 | A1 | | 9/2015 |
| WO | 2016/027098 | A1 | | 2/2016 |

OTHER PUBLICATIONS

International Search Report of corresponding Patent Application No. PCT/KR2016/011886—6 pages (dated Jan. 25, 2017).
Notice of Allowance of Korean Patent Application No. 10-2016-0128358—1 page (dated Apr. 25, 2017).
Extended European Search Report of corresponding European Patent Application No. 16897192.7—7 pages (dated Oct. 28, 2019).
Office Action of corresponding Chinese Patent Application No. 201680084199.8—7 pages (dated Jun. 2, 2020).
Office Action of JP 2018-546879 dated Oct. 7, 2020—6 pages.
K. Witt: "Onboard Reliquefaction of LNG Boil-off", and Trans. I. Marine Eng. vol. 92, and Part 1, pp. 22-35, ISSN 0309-3948.
Manuel Romero-Gomez et al., "On board LNG relique-faction technology: a comparative study", and Polish Maritime Research (wave), Gdansk University of Technology, 2013, and vol. 21, p. 77-88, DOI:10.2478-/pomr-2014-0011, ISSN 2083-7429.

* cited by examiner

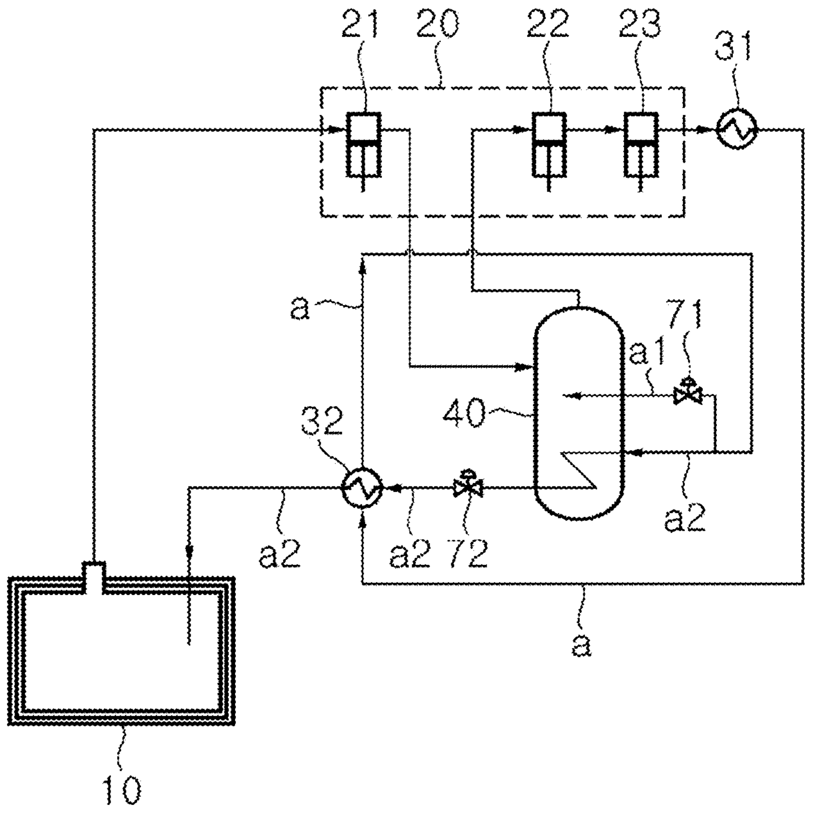
21
20
22
23
31
a
71
a1
40
32
a2
a2
a2 72
a
10

SHIP

TECHNICAL FIELD

The present invention relates to a ship and, more particularly, to a ship including a system which reliquefies boil-off gas generated in a storage tank using boil-off gas itself as a refrigerant.

BACKGROUND ART

Even when a liquefied gas storage tank is insulated, there is a limit to completely block external heat. Thus, liquefied gas is continuously vaporized in the storage tank by heat transferred into the storage tank. Liquefied gas vaporized in the storage tank is referred to as boil-off gas (BOG).

If the pressure in the storage tank exceeds a predetermined safe pressure due to generation of boil-off gas, the boil-off gas is discharged from the storage tank through a safety valve. The boil-off gas discharged from the storage tank is used as fuel for a ship, or is reliquefied and returned to the storage tank.

DISCLOSURE

Technical Problem

Typically, a boil-off gas reliquefaction system employs a refrigeration cycle for reliquefaction of boil-off gas through cooling. Cooling of boil-off gas is performed through heat exchange with a refrigerant and a partial reliquefaction system (PRS) using boil-off gas itself as a refrigerant is used in the art.

Embodiments of the present invention provide a ship including an improved partial reliquefaction system capable of more efficiently reliquefying boil-off gas.

Technical Solution

In accordance with one aspect of the present invention, there is provided a ship having a liquefied gas storage tank, the ship including: a multistage compressor including a plurality of compression cylinders to compress boil-off gas discharged from the storage tank; a second heat exchanger cooling the fluid compressed by the multistage compressor by subjecting the fluid to heat exchange; a first decompressor expanding one (hereinafter referred to as "flow a1") of two flows branching off of the fluid cooled by the second heat exchanger (hereinafter referred to as "flow a"); a third heat exchanger cooling the other flow (hereinafter referred to as "flow a2") of the two flows by subjecting the flow a2 to heat exchange with the flow a1 expanded by the first decompressor as a refrigerant; and a second decompressor expanding the flow a2 cooled by the third heat exchanger, wherein the second heat exchanger cools the fluid compressed by the multistage compressor using the flow a2 expanded by the second decompressor as a refrigerant.

The boil-off gas compressed by some of the plurality of compression cylinders may be compressed by the other compression cylinders after being cooled through heat exchange in the third heat exchanger.

The fluid compressed by some of the plurality of compression cylinders and having been cooled by the third heat exchanger may be compressed by the other compression cylinders after joining the flow a1 expanded by the first decompressor and having been used as a refrigerant in the third heat exchanger.

The ship may further include: a first heat exchanger cooling the boil-off gas compressed by the multistage compressor by subjecting the boil-off gas to heat exchange before the boil-off gas is supplied to the second heat exchanger.

In accordance with another aspect of the present invention, there is provided a boil-off gas reliquefaction method used in a ship including a liquefied gas storage tank, the boil-off gas reliquefaction method including: 1) compressing boil-off gas discharged from the storage tank and cooling, by a third heat exchanger, the compressed boil-off gas; 2) further compressing the fluid cooled by the third heat exchanger in step 1); 3) cooling, by a second heat exchanger, the boil-off gas further compressed in step 2); 4) dividing the fluid cooled by the second heat exchanger in step 3) into two flows; 5) expanding one of the two flows divided in step 4) and using the one flow as a refrigerant in the third heat exchanger; 6) cooling, by the third heat exchanger, the other flow of the two flows divided in step 4); and 7) expanding and reliquefying the fluid cooled by the third heat exchanger in step 6), wherein the boil-off gas reliquefied in step 7) is supplied to the second heat exchanger to be used as a refrigerant cooling the boil-off gas further compressed in step 3).

The fluid cooled by the third heat exchanger in step 1) may be further compressed in step 2) after joining the fluid expanded and having been used as a refrigerant in the third heat exchanger in step 5).

The boil-off gas further compressed in step 2) may be cooled by a first heat exchanger before being cooled by the second heat exchanger in step 3).

Advantageous Effects

According to the present invention, a refrigerant for reliquefaction of boil-off gas can be diversified, thereby reducing the amount of boil-off gas branching off upstream of a heat exchanger to be used as the refrigerant.

Since the boil-off gas branching off to be used as a refrigerant is subjected to a compression process in a multistage compressor, reduction in amount of the boil-off gas can also cause reduction in amount of boil-off gas compressed by the multistage compressor, whereby the same level of reliquefaction efficiency can be achieved with lower power consumption of the multistage compressor.

DESCRIPTION OF DRAWINGS

FIG. 1 is a schematic block diagram of a partial reliquefaction system used in a ship according to an exemplary embodiment of the present invention.

BEST MODE

Hereinafter, embodiments of the present invention will be described in detail with reference to the accompanying drawings. A ship according to the present invention may be widely used in applications such as a ship equipped with an engine fueled by natural gas and a ship including a liquefied gas storage tank. It should be understood that the following embodiments can be modified in various ways and do not limit the scope of the present invention.

Systems for treatment of boil-off gas according to the present invention as described below may be used in all kinds of ships and offshore structures including a storage tank capable of storing liquid cargo or liquefied gas at low temperature, that is, ships such as liquefied gas carriers and offshore structures such as FPSOs or FSRUs.

In addition, a fluid in each line according to the invention may be in a liquid phase, in a gas/liquid mixed phase, in a gas phase, or in a supercritical fluid phase, depending on system operation conditions.

FIG. 1 is a schematic block diagram of a partial reliquefaction system applied to a ship according to an exemplary embodiment of the present invention.

Referring to FIG. 1, a ship according to this embodiment includes: a multistage compressor 20 including a plurality of compression cylinders 21, 22, 23; a second heat exchanger 32; a third heat exchanger 40; a first decompressor 71; and a second decompressor 72.

Liquefied gas stored in a storage tank 10 of the ship according to this embodiment may have a boiling point of higher than −110° C. at 1 atm. In addition, the liquefied gas stored in the storage tank 10 may be liquefied petroleum gas (LPG) or may include multiple components such as methane, ethane, and heavy hydrocarbons.

In this embodiment, the multistage compressor 20 compresses boil-off gas discharged from the storage tank 10. The multistage compressor 20 may include a plurality of compression cylinders, for example, three compression cylinders 21, 22, 23, as shown in FIG. 1. In this embodiment, the boil-off gas discharged from the storage tank 10 and having been compressed by some of the plurality of compression cylinders of the multistage compressor 20 is cooled by the third heat exchanger 40 and then supplied back to the multistage compressor 20 to pass through the other compression cylinders. FIG. 1 shows a process in which the boil-off gas compressed by the first compression cylinder 21 is cooled by the third heat exchanger 40 and then compressed by the second compression cylinder 22 and the third compression cylinder 23.

The fluid passing through some compression cylinders 21 of the multistage compressor 20, cooled by the third heat exchanger 40, and having passed through the other compression cylinders 22, 23 is cooled through a self-heat exchange process in the second heat exchanger 32 and then is supplied back to the third heat exchanger 40 (flow a). In the term "self-heat exchange", "self-" means that boil-off gas itself is used as a refrigerant for heat exchange.

In this embodiment, the fluid compressed by the multistage compressor 20 may be cooled by a first heat exchanger 31 before being supplied to the second heat exchanger 32. The first heat exchanger 31 may use a separate refrigerant such as seawater as a refrigerant for cooling boil-off gas. Alternatively, the first heat exchanger 31 may be configured to use boil-off gas itself as the refrigerant, like the second heat exchanger 32.

A pressure at which the fluid having been subjected to multistage compression in the multistage compressor 20 is discharged from the multistage compressor 20 (hereinafter, "discharge pressure of the multistage compressor") may be determined based on the temperature of the fluid discharged from the first heat exchanger 31 after being cooled by the first heat exchanger 31. Preferably, the discharge pressure of the multistage compressor 20 is determined by a saturated liquid pressure corresponding to the temperature of the fluid discharged from the first heat exchanger 31 after being cooled by the first heat exchanger 31. That is, when the liquefied gas is LPG, the discharge pressure of the multistage compressor 20 may be determined by a pressure at which at least a portion of the fluid having passed through the first heat exchanger 31 becomes a saturated liquid. In addition, a pressure at which the fluid having passed through each compression stage is discharged from a corresponding compression cylinder may be determined by performance of the corresponding compression cylinder.

The fluid having passed through the multistage compressor 20 and the second heat exchanger 32 (flow a) is divided into two flows a1, a2 upstream of the third heat exchanger 40. The flow a1 is expanded by the first decompressor 71 to be reduced in temperature and is then used as a refrigerant in the third heat exchanger 40 and the flow a2 is subjected to heat exchange in the third heat exchanger 40 to be cooled and is then expanded by the second decompressor 72 to be partially or entirely reliquefied. The fluid having been used as a refrigerant in the third heat exchanger 40 (flow a1) is supplied to the multistage compressor 20 to be compressed by the other compression cylinders 22, 23 after joining the fluid compressed by some compression cylinders 21 of the multistage compressor 20 and having been supplied to the third heat exchanger 40.

The second heat exchanger 32 cools the fluid having been compressed by the multistage compressor 20 (flow a) using the fluid cooled by the third heat exchanger 40 and having been expanded by the second decompressor 72 to be partially or entirely reliquefied (flow a2) as a refrigerant. The fluid having been used as a refrigerant in the second heat exchanger 32 (flow a2) is supplied to the storage tank 10 and the fluid having been cooled by the second heat exchanger 32 (flow a) is supplied to the third heat exchanger 40.

In this embodiment, each of the first decompressor 71 and the second decompressor 72 may be an expansion valve such as a Joule-Thomson valve or may be an expander depending on system configuration. In this embodiment, the second heat exchanger 32 may be an economizer and the third heat exchanger 40 may be an intercooler.

For example, when the liquefied gas is LPG, the fluid having been compressed by the multistage compressor 20 passes through the first heat exchanger 31 to be cooled. Here, at least a portion of the fluid may be liquefied in the first heat exchanger 31 and be supercooled by the second heat exchanger 32. In addition, the fluid having been supercooled by the second heat exchanger 32 is divided into the flow a1 and the flow a2, wherein the flow a1 is used as a refrigerant in the third heat exchanger 40 after being expanded by the first decompressor 71 and the flow a2 is secondarily supercooled by the third heat exchanger 40 using the flow a1 as a refrigerant. The flow a2 having been supercooled by the third heat exchanger 40 is expanded by the second decompressor 72 and then returned in a liquid phase to the storage tank 10.

Although, in this embodiment, the boil-off gas compressed by the multistage compressor 20 is described as being subjected to a single intermediate cooling process through the third heat exchanger 40, it should be understood that the present invention is not limited thereto and the boil-off gas compressed by the multistage compressor 20 may be subjected to a multistage intermediate cooling process. For example, when the multistage compressor 20 includes three compression cylinders 21, 22, 23, the boil-off gas having been compressed by the first compression cylinder 21 may be compressed by the second compression cylinder 22 after being cooled by the third heat exchanger 40, and then subjected to an additional intermediate cooling process before being compressed by the third compression cylinder 23. Also, in the additional intermediate cooling process, a flow of boil-off gas branching off upstream of a corresponding heat exchanger may be used as a refrigerant after being expanded, as in the intermediate cooling process through the third heat exchanger 40.

According to the present invention, since the fluid having been partially or entirely liquefied through compression in the multistage compressor 20, cooling in the third heat exchanger 40, and expansion in the second decompressor 72 is used as a refrigerant in the second heat exchanger 32 to further cool the fluid having been compressed by the multistage compressor 20, the temperature of the fluid supplied to the third heat exchanger 40 (flow a) can be further reduced. As a result, the same level of reliquefaction efficiency can be achieved with a lower amount of boil-off gas branching off to be used as a refrigerant (flow a1). In addition, since the fluid having been used a refrigerant in the third heat exchanger 40 (flow a1) is compressed by the multistage compressor 20, energy consumption of the multistage compressor 20 can be reduced by reducing the amount of the fluid used as a refrigerant in the third heat exchanger 40 (flow a1). In other words, with the second heat exchanger 32, the partial reliquefaction system according to the present invention can reduce the amount of the fluid used as a refrigerant in the third heat exchanger 40 (flow a1), thereby reducing energy consumption of the multistage compressor 20 while achieving almost the same level of reliquefaction efficiency.

Although some embodiments have been described, it will be apparent to those skilled in the art that these embodiments are given by way of illustration only, and that various modifications, changes, alterations, and equivalent embodiments can be made without departing from the spirit and scope of the invention.

The invention claimed is:

1. A ship comprising:

a storage tank configured to store liquefied gas;

a multistage compressor comprising a plurality of compressors connected in series and configured to compress boil-off gas (BOG) discharged from the storage tank to provide compressed BOG;

a first heat exchanger configured to cool and liquefy at least part of the compressed BOG, which provides a first flow of cooled compressed BOG;

a second heat exchanger configured to further cool the first flow of cooled compressed BOG;

a first decompressor configured to expand a first portion of the first flow, which further cools the first portion and provides an expanded flow;

a third heat exchanger configured to cool a second portion of the first flow with the expanded flow from the first decompressor for further cooling the second portion; and a second decompressor configured to expand the cooled second portion, which provides a liquefied flow to a liquefied gas return line connecting between the second decompressor and the storage tank, wherein the second heat exchanger is on the liquefied gas return line and interposed between the second decompressor and the storage tank, wherein the second heat exchanger is configured to heat-exchange the liquefied flow returning to the storage tank in the liquefied gas return line with the first flow of cooled compressed BOG from the first heat exchanger such that the liquefied flow flowing back to the storage tank from the second decompressor is heated in the liquefied gas return line prior to arriving at the storage tank and such that the first flow of cooled compressed BOG is further cooled prior to arriving the first decompressor and the second decompressor.

2. The ship according to claim 1, wherein the third heat exchanger is configured to return the expanded flow to the multistage compressor such that the expanded flow is compressed to provide at least part of the compressed BOG.

3. A boil-off gas reliquefaction method for use in a ship having a storage tank storing liquefied gas, the boil-off gas reliquefaction method comprising:

compressing, by a multi-stage compressor comprising a plurality of compressors connected in series, boil-off gas (BOG) discharged from the storage tank to provide compressed BOG;

cooling and liquefying, by a first heat exchanger, at least part of the compressed BOG to provide a first flow of cooled compressed BOG;

further cooling, at a second heat exchanger, the first flow of the cooled compressed BOG;

expanding and further cooling, by a first decompressor, a first portion of the first flow to provide an expanded flow;

heat-exchanging, at a third heat exchanger, a second portion of the first flow with the expanded flow from the first decompressor for further cooling the second portion; and expanding, at a second decompressor, the cooled second portion to provide a liquefied flow to a liquefied gas return line connecting between the second decompressor and the storage tank, wherein the second heat exchanger is on the liquefied gas return line and interposed between the second decompressor and the storage tank, wherein the method further comprises heat-exchanging, at the second heat exchanger, the liquefied flow returning to the storage tank in the liquefied gas return line with the first flow of cooled compressed BOG from the first heat exchanger such that the liquefied flow flowing back to the storage tank from the second decompressor is heated in the liquefied gas return line prior to arriving at the storage tank and such that the first flow of cooled compressed BOG is further cooled prior to arriving the first decompressor and the second decompressor.

4. The boil-off gas reliquefaction method according to claim 3, wherein the method further comprises:

returning, from the third heat exchanger, the expanded flow to the multi-stage compressor such that the expanded flow is compressed to provide at least part of the compressed BOG.

* * * * *